March 27, 1956  J. D. MADARAS  2,739,606
VALVE
Filed Nov. 7, 1949  2 Sheets-Sheet 1

INVENTOR.
JULIUS D. MADARAS
BY
Whittemore Hulbert & Belknap
ATTORNEYS

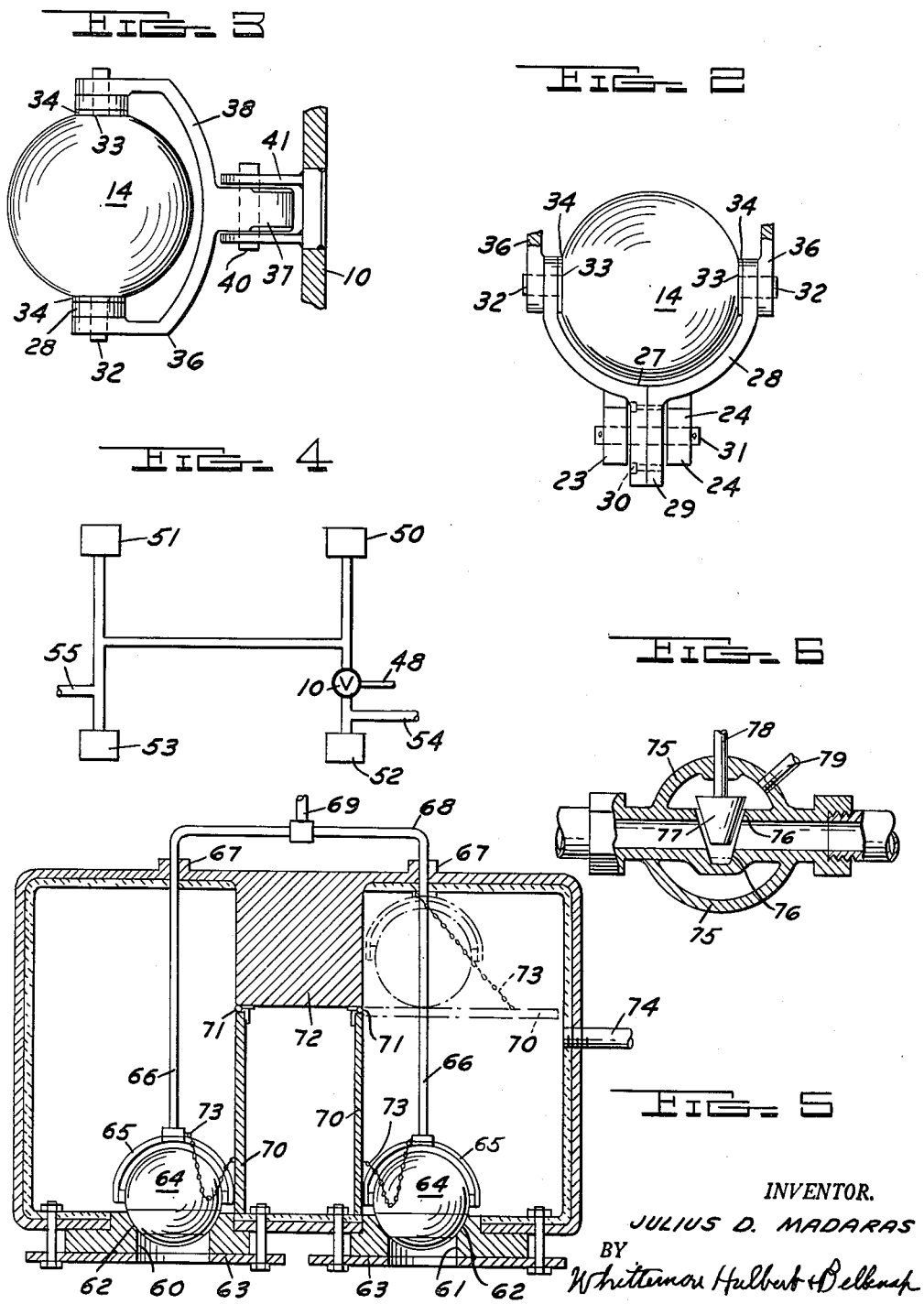

United States Patent Office 2,739,606
Patented Mar. 27, 1956

2,739,606

VALVE

Julius D. Madaras, Detroit, Mich., assignor to Madaras Corporation, Wilmington, Del., a corporation of Delaware Application November 7, 1949, Serial No. 125,935

3 Claims. (Cl. 137—246)

My invention relates generally to valve structures, and more particularly to a new type of valve provided with a gas seal to positively prevent any leakage of line fluid into or through the valve.

It is an object of the present invention to obtain a simple construction which may be easily operated either manually or mechanically, and which is particularly adapted for securely separating two different types of fluid by putting a harmless gas seal between said fluids.

It is a further object to obtain a construction which is well suited for use with various types of fluid systems, including systems wherein exceptionally hot gases are employed.

Other objects and advantages of my invention will be apparent from the following description, especially when taken in conjunction with the accompanying drawings, wherein:

Figure 2 is a section along line 2—2 of Figure 1;

Figure 3 is a section along line 3—3 of Figure 1;

Figure 4 is a diagram of a system in which my valve is inserted;

Figure 5 is a modification illustrating a different type of valve construction; and Figure 6 is a still different construction embodying the features of my invention.

Figure 1:
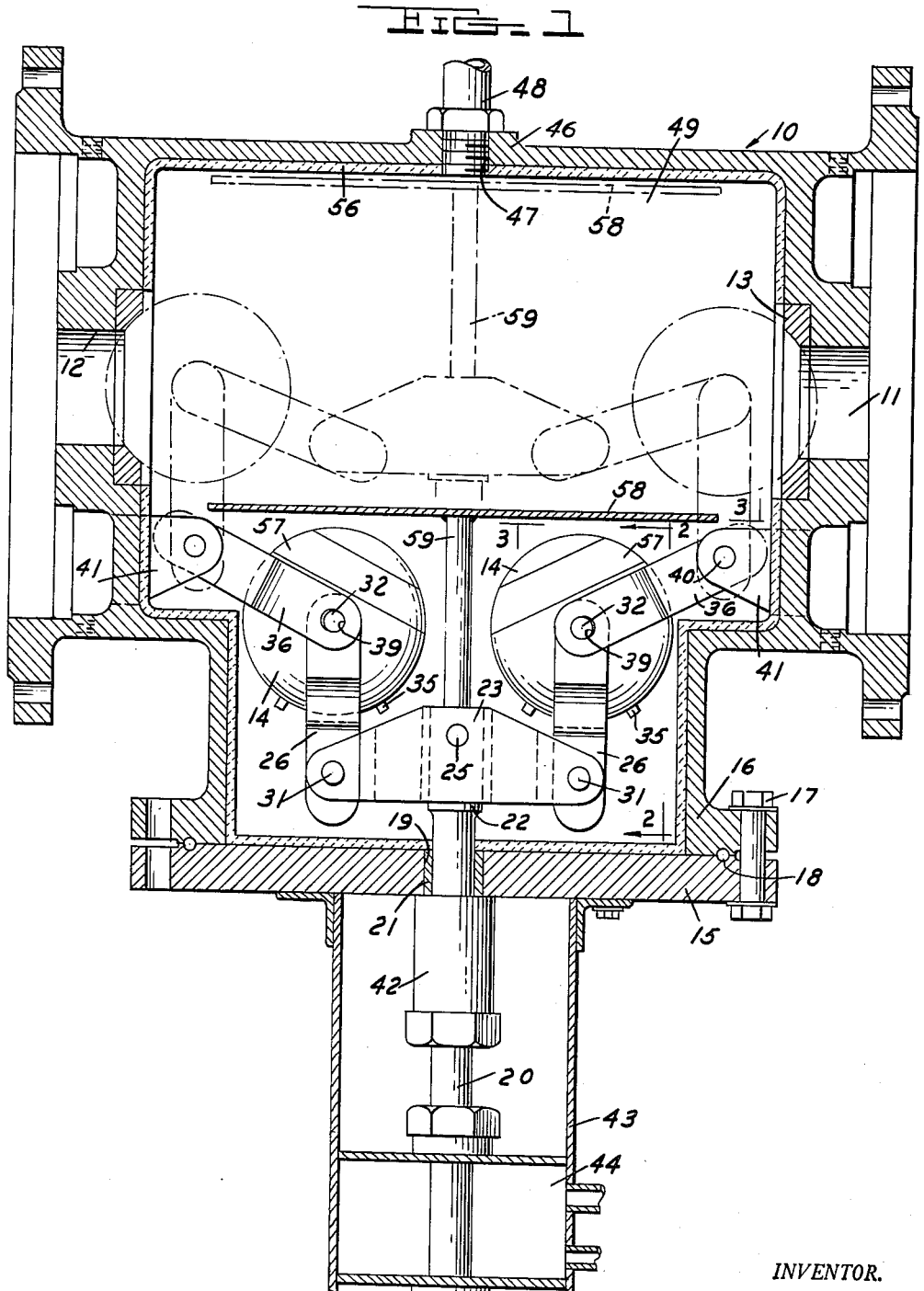
Figure 1 is a sectional view of a valve embodying the features of my invention, some of the parts being shown in elevation.

Referring now to the drawings, wherein identical reference numerals are used to identify similar parts, there is illustrated a T-type of valve having a casing 10 provided with opposed openings 11 and 12 respectively and having valve seats 13 for receiving a pair of balls 14 for closing the valve. The valve is adapted to be connected into a line (not shown) so that the fluid therein may flow through the valve in either direction through the openings 11 and 12.

The casing 10 is provided with a bottom wall in the form of a plate 15 secured to an annular flange 16 on the bottom of the casing 10 by means of bolts 17. A suitable sealing ring 18 is provided between the flange 16 and plate 15 to form a tight seal therebetween.

The plate 15 is centrally apertured at 19 to receive an operating rod 20 provided with a suitable bushing 21. The operating rod has an enlarged upper end 22 within the casing, to which is secured a spaced pair of cross members 23 and 24. The cross members 23 and 24 are pivotally secured to the portion 22 by means of a pin 25 which is held in position with cotter pins or other suitable means.

At opposite ends of the cross members are a pair of yokes 26 each of which forms a U-shaped cradle 27 at its upper end. As specifically illustrated, each yoke is formed in two sections each of which comprises a curved upper arm portion 28 and a shank or stem portion 29. The stems of each section are secured together by means of countersunk screws 30 to form the U-shaped cradle 27 between the opposing upper arms 28.

The yokes 26 are pivotally mounted between the spaced outer ends of the cross members by means of pins 31 extending through aligned apertures in the cross members and the stem portions 29.

The balls 14 are pivotally supported on their respective yokes by means of diametrically opposed pairs of trunnions 32 which extend through suitable apertures in the upper ends of the cradles 27. The surfaces of the balls adjacent the trunnions are flattened as indicated at 33, and washers 34 are provided between the flattened surfaces and the cradles 27. Each ball is also provided with a pair of projecting studs 35 on opposite sides of its cradle adjacent the bottom thereof. These studs are adapted to engage the cradle to limit rotation of the balls in either direction for a reason to be hereinafter described.

A second pair of yokes 36 have stem portions 37 and cradle portions 38, the cradle portions 38 being somewhat greater in width than the cradles 27 on the previously described yokes. The dimensions are such that the cradles 27 fit between the arms of the cradles 38, with the trunnions 32 extending through aligned apertures 39 in the latter. The apertures 39 are somewhat elongated to permit a small amount of play during operation of the valve.

The yokes 36 are pivotally secured by pins 40 to brackets 41 which are welded or otherwise rigidly secured to opposite sides of the casing.

The operating rod 20 extends downward through the aperture 19 in the bottom plate and is provided with a suitable packing gland 42. A tubular casing 43 surrounds the operating rod and is provided with a compartment 44 forming a water jacket for cooling the operating rod. An air cylinder 45 is connected to the operating rod for actuating the same.

A boss 46 surrounds an internally threaded opening 47 in the top wall of the casing into which is screwed a threaded pipe 48 for introducing fluid under pressure into the valve chamber 49. Any suitable type of valve mechanism (not shown) may be provided on the pipe 48 to control the flow of pressure fluid into and out of the chamber.

In operation, the valve is inserted into the line at any desired point. When the valve is in open position as shown in Figure 1 the fluid in the line may flow through the valve in either direction through the opposed openings 11 and 12. In order to close the valve the operating rod is moved upward by means of the air cylinder thereby raising the balls 14 by means of the yokes 26 secured to the cross members 23 and 24. As the cross members continue to move upward the yokes 26 and 36 pivot about their respective pins 31 and 40 to guide the balls to their respective seats 13 where they assume the position indicated by dotted lines in Figure 1. Continuing upward pressure on the cross members assures that the valves are firmly seated, since the balls have sufficient freedom of rotation about their trunnions to compensate for any slight irregularities or misalignment between the balls and their seats. After the balls are seated, pressure fluid is admitted into the chamber 49 to hold the balls firmly in their seated position against any force that may be exerted by pressure in the line trying to unseat the balls and open the valve. In order to open the valve, the pressure is first released from the chamber 49 through the pipe 48 and the air cylinder is then operated to lower the cross members thereby removing the balls from their seats and returning them to their original position.

It will be understood that the above described cycle of operation may be mechanically or otherwise controlled so that the valve will function automatically in any system in which it is installed. One type of system in which the novel features and advantages of my valve are utilized to the fullest extent will now be briefly described.

Referring to the diagram in Figure 4, there is illustrated a system for reducing and melting metallic ores. Gas crackers 50 and 51 are connected as shown by pipes to a pair of retorts 52 and 53 which have been charged with iron ore or other material. Hot air inlet pipes 54 and 55 are also provided. In carrying out the process, hot reducing gas and hot air are alternately admitted to the retorts, and at some stages it might be advisable to supply reducing gas to one retort while hot air is being supplied to the other retort. For example, suppose it is desired to supply gas from the cracker 50 to the retort 53 at the same time hot air is being admitted to retort 52 through the pipe 54. Since the hot air and gas can not be mixed without burning or exploding, my improved type of valve is inserted in the line as indicated at 10. Then, when the balls are seated as previously described, neutral gas or steam under pressure is admitted into the valve 10 through the pipe 48 thereby forming a positive gas seal between the two active gases on either side.

The pressure of the steam or other neutral gas within the valve may be regulated as desired. The pressure required to merely hold the balls to their seats may be considerably less than the line pressure on either side of the valve due to the vastly greater surface area acted upon by the steam or neutral gas. However, in cases where it is necessary to separate two gases so that there is no possibility of them becoming mixed, it is advisable to maintain a higher pressure of neutral gas within the valve than is in either line. Then, in case any leakage should occur, the neutral gas will leak out into the line rather than the active gases leaking into the valve and combining. Any leakage of the neutral gas into the line would be relatively harmless, and could be detected so that the cause of the leak could be eliminated. The importance of this added safety feature in my improved valve will readily be appreciated, especially when consideration is given to the fact that the fluids, either liquids or gases, in the line might be such that a violent explosion would occur if they were allowed to mix with each other.

It will be evident that rather wide variations in constructional details and materials will be possible within the limits of my invention. For example, in a process such as outlined above where very hot gases are in contact with the valve, the casing may be protected by a refractory layer 56. The valve seats 13 may also be made of refractory material in some cases, since the valve seats are submitted to compression forces only and there is no sliding of the balls under pressure.

When used in a system employing very hot gases, it is advisable to protect the balls 14 by means of a hard faced, corrosion resistant layer. Thus as illustrated in Figure 1, a band or zone of hard facing material 57, such as Stellite for instance, is provided at the point where the ball makes contact with its seat 13. The width of the hard faced zone is related to the spacing between the studs 35 in such a manner that the ball is prevented from rotating to a position wherein the hard faced zone would be out of contact with the valve seat when the valve is closed.

As a further means of protecting the balls from the hot gases passing through the open valve, an insulating plate 58 of suitable material is connected to the cross members by a supporting rod 59. When the valve is open and the balls are in retracted position, the insulating plate 58 will cover the balls to protect them from the hot gases.

In Figure 5 there is illustrated a modified construction of a valve embodying my new gas seal principle. The valve comprises a casing having a spaced pair of openings 60 and 61 therein surrounded by valve seats 62. As specifically illustrated, each of the valve seats 62 is in the form of a removable plate which is clamped securely in position by means of a plate 63 bolted to the lower wall of the casing. Balls 64 are supported by yokes 65 having stem portions 66 extending through the top of the casing and provided with packing glands 67. The stems are connected by a cross member 68 which may be raised and lowered by means of a plunger 69. A pair of protective plates 70 are hinged at 71 to a downward projecting portion 72 of the upper wall of the casing. The plates are respectively secured to their corresponding yokes by means of slack chains 73. The arrangement is such that as the balls are being raised from their seats the slack in the chains is first taken up and the plates 70 then pivot on their hinges to assume a horizontal position beneath the balls to protect them from the hot gases. It will be apparent that with this type of construction the fluid will enter the valve through one opening and go out through the other in a reverse direction.

The valve is provided with a conduit 74 for introducing pressure fluid into the casing when the balls are seated and the valve is closed. The purpose and function of the pressure fluid is the same as described above. This type of construction is simpler than that of the previously described valve, and has the additional feature that the balls are aided in seating by the force of gravity.

It will be appreciated that the ball type of valves above described are particularly well suited for high temperature operations in which other types of valves would be impractical because of expansion and warpage. In some processes where this type of valve is being used, the gases in the line attain extremely high temperatures in the neighborhood of 2000° F. With my improved construction however, both the seat and ball are relatively free from serious distortion due to warpage, and even though the seat and ball may expand and contract at somewhat different rates, the balls, under pressure from within the valve, will always maintain a gas-tight contact with the valve seats.

In Figure 6 is illustrated a conventional gate valve that has been modified and adapted to utilize my new gas seal principle. As in conventional constructions the valve comprises a body 75 provided with seats 76, a gate 77 and an operating stem 78. A conduit 79 is provided in the valve body for introducing compressed fluid into the body when the valve is closed. Any suitable valve arrangement (not shown) is provided for controlling the pressure introduced into the valve body and for releasing the same.

In operation, when the gate is closed, pressure fluid is admitted through conduit 79 into the valve body to form a positive gas seal around the valve seats 76. The pressure of the gas seal may be high enough so that any leakage that might occur would be leakage of the harmless compressed gas into the line as previously explained.

From the foregoing description it will be evident that my invention is for a new and useful principle of valve construction and operation, and is not limited in its application to the specific embodiments shown. In its broader aspects my invention relates to an improved type of gas sealed valves, the scope of which is indicated by the appended claims.

What I claim as my invention is:

1. A valve comprising a casing having a chamber therein provided with two ports, two conduits connected to the respective ports of said casing and adapted to be connected to sources of hot gases which can not be commingled without danger, valve seats within said chamber surrounding each of said ports, two spherical valves for respectively engaging said seats, valve operating means for withdrawing said spherical valves into a portion of said chamber out of the normal path of gas flow through said chamber from one port to the other, a heat resisting shield spaced from and out of thermal conductive relation to said valves separating the portion of said chamber into which said spherical valves are withdrawn from said portion through which the gas normally flows, and means operably connected to said valve operating means for moving said heat resisting shield out of the path of said valves during movement thereof.

2. A valve comprising a casing having a chamber therein provided with two ports, two conduits connected to the respective ports of said casing and adapted to be connected to sources of hot gases which can not be commingled without danger, valve seats within said chamber surrounding each of said ports, two spherical valves for respectively engaging said seats, valve operating means for withdrawing said spherical valves into a portion of said chamber out of the normal path of gas flow through said chamber from one port to the other, said valve operating means including a pair of bifurcated levers each embracing at one end one of said spherical valves, each of said levers being pivoted at its opposite end to swing its valve out of said normal path of flow, and means connected with said chamber for introducing and withdrawing a pressure gas nonreactive with the gas in either of said conduits for holding said spherical valves against their respective seats and for preventing leakage from said conduits into said chamber.

3. A valve comprising a casing having a gas passageway therethrough and a pair of axially aligned ports on opposite sides thereof, said casing having a laterally offset portion out of the normal gas flow through said passageway, valve seats within said chamber surrounding each of said ports, two spherical valves for respectively engaging said seats, a pair of bifurcated levers each embracing at one end one of said spherical valves, each of said levers being pivoted at its opposite end to said casing to swing its valve from engagement with said seat to a position in said offset portion of the casing, a cross member within said casing, a pair of levers pivoted to said cross member and each pivoted to one of said spherical valves, and an operating rod for moving said cross member to simultaneously move said bifurcated levers and thereby swing said spherical valves from offset position into engagement with the respective seats.

References Cited in the file of this patent

UNITED STATES PATENTS

| | | |
|---|---|---|
| 570,609 | Schneider | Nov. 3, 1896 |
| 1,826,941 | La Mont | Oct. 13, 1931 |
| 2,010,992 | Howard | Aug. 13, 1935 |
| 2,076,336 | Fahey | Apr. 6, 1937 |
| 2,176,594 | Nordstrom | Oct. 17, 1939 |
| 2,336,694 | Mattimore | Dec. 14, 1943 |

FOREIGN PATENTS

| | | |
|---|---|---|
| 4,947 | Great Britain | 1893 |